UNITED STATES PATENT OFFICE.

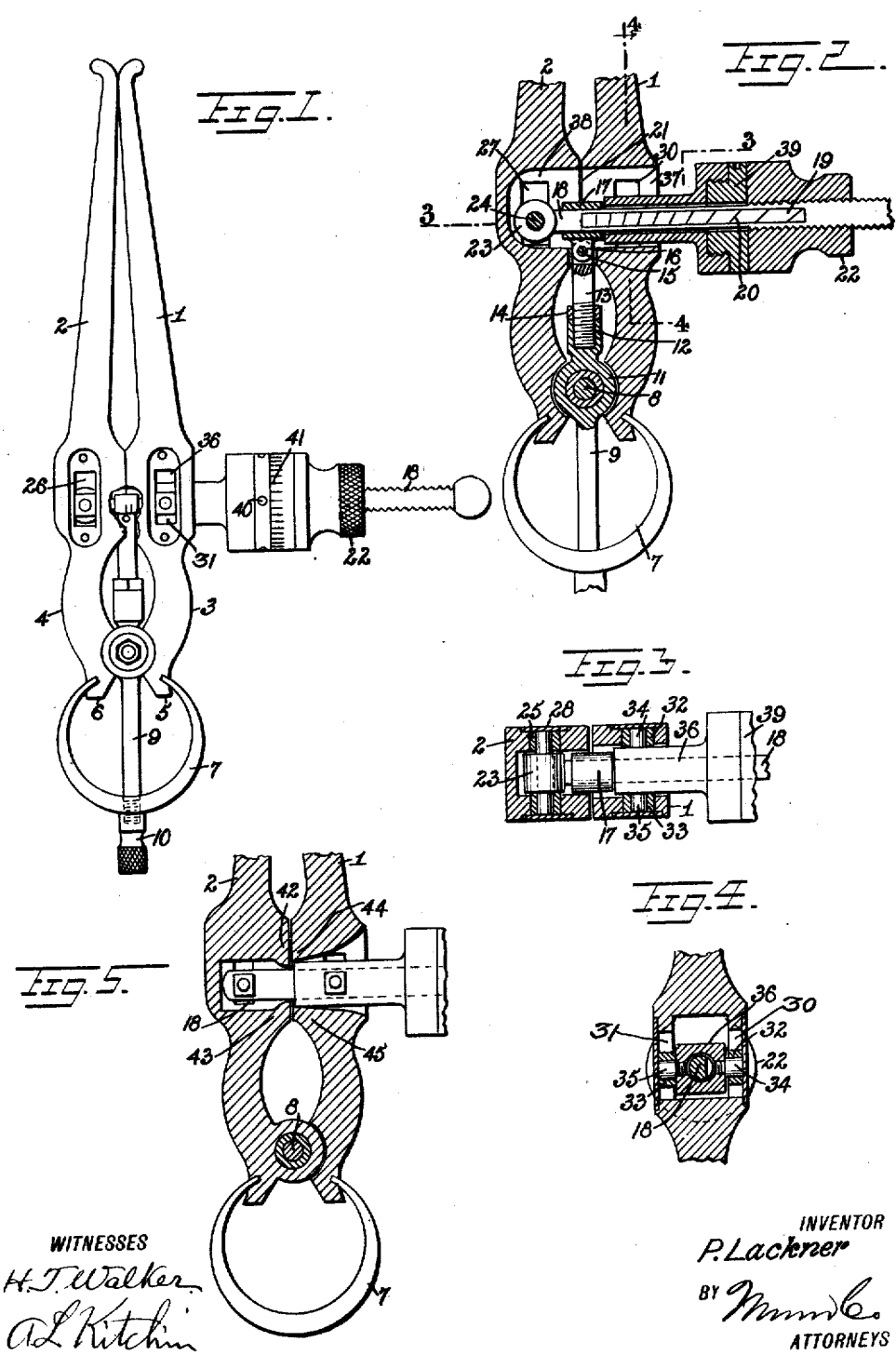

PETER LACKNER, OF NEW BRUNSWICK, NEW JERSEY.

UNIVERSAL MICROMETER.

1,266,493. Specification of Letters Patent. Patented May 14, 1918.

Application filed May 29, 1917. Serial No. 171,670.

*To all whom it may concern:*

Be it known that I, PETER LACKNER, a citizen of the United States, and a resident of New Brunswick, in the county of Middlesex and State of New Jersey, have invented a new and Improved Universal Micrometer, of which the following is a full, clear, and exact description.

This invention relates to measuring instruments and particularly to a micrometer and has for an object the provision of an improved construction whereby the usual calipers effect is produced and at the same time a micrometer adjustment provided.

Another object in view is to provide a micrometer instrument having caliper legs associated with mechanism for causing the opening and closing members to maintain the same distance from the center at all times.

In the accompanying drawing:

Figure 1 is an elevation of a universal micrometer disclosing an embodiment of the invention.

Fig. 2 is a longitudinal vertical section through the structure shown in Fig. 1, the same being on a slightly enlarged scale.

Fig. 3 is a fragmentary sectional view through Fig. 2 on line 3—3.

Fig. 4 is an enlarged detail side elevation of one of the journal pins embodying certain features of the invention.

Fig. 5 is a view similar to Fig. 2 but showing a slightly modified construction.

Referring to the accompanying drawing by numerals, 1 and 2 indicate caliper legs of substantially the usual construction, said legs having enlarged upper ends 3 and 4 and extensions 5 and 6 for receiving the ends of a spring 7 whereby there is a continual tendency for the legs to separate. The ends 3 and 4 are pivotally connected together by suitable overlapping ears connected together by a pivotal bolt 8, said bolt preferably having a head on one end and a nut on the opposite end so that the ears may be clamped tightly together in order to lock the legs 1 and 2 against movement whenever desired, the overlapping ears being sufficiently resilient for allowing this action.

A compensating bar 9 is provided having one end extending through an aperture in the spring 7 to which is secured a thumb nut 10, while the central part of the bar is provided with an apertured enlargement 11 surrounding the pin 8 and merging into an extension 12 having an internally threaded socket for receiving the bar 13, said bar being locked in any desired adjusted position by a nut 14. The end of bar 13 opposite the extension 12 is bifurcated and formed with apertures for receiving the pivotal pin 15, which pivotal pin extends through the ear 16 on the sleeve 17, sleeve 17 slidingly fitting the bar 18. Bar 18 is provided with a scale 19 having graduations 20 arranged at different angles, all of said graduations pointing toward the center of pin 8 whereby the edge 21 may be positioned parallel with any of the graduations 20 according to the position of the legs 1 and 2. Part of the sleeve 17 is also provided with graduations so as to indicate the amount of opening as the legs move from a closed position to an open position.

The sleeve 17 is held centrally by reason of the compensator 9, though the sleeve 17 is allowed a pivotal movement, said pivotal movement being desirable in order that the sleeve may automatically adjust itself to slight movements of the bar 18 and also in order that the pin 15 may be removed when adjusting the bar 13. When this occurs the pin 15 is not only removed but sleeve 17 is moved to one side and nut 14 is loosened, whereupon the bar 13 is adjusted to the position desired and nut 14 tightened, after which the sleeve 17 is moved back to its former position and pin 15 reinserted. Usually only one adjustment of these parts is necessary, which takes place before the instrument leaves the manufacturing establishment. The provision of the compensator 9 and associated parts is to maintain the bar 18 the same distance from the pin 8 at all times so that the movement caused by nut 22 or by spring 7 will be in the proper ratio.

The bar 18 is provided with an enlargement 23 having a round aperture therethrough for accommodating the round pin 24, said pin carrying bushings 25 and 26 at the opposite ends, said bushings having a round aperture for accommodating the pin 24 and squared sides for fitting into the respective slots 26 and 27. Covering and retaining plates 28 and 29 are provided, said plates being held in position by any suitable means. As the legs 1 and 2 open and close the bar 18 is held a certain distance from pin 8 but the slots 26 and 27 allow a proper pivotal movement. In order to produce a proper movement of the leg 1 said leg is provided with slots 30 and 31 for accommodating the sleeves 32 and 33 (Fig. 3), said sleeves having round apertures for accommodating the round pins 34 and 35 secured to the sleeve 36 by any suitable means, as for instance, by being screwed therein as shown in Fig. 4. Sleeve 36 is preferably square in cross section and snugly fits the opening or cutaway portion 37 in leg 1, whereby there is no lost motion but a free sliding action is permitted. The cutaway portion 37 permits a proper back and forth movement of the bar 18 in the enlargement 23 in leg 2 so that the legs may freely move together or apart as desired and may be set so that the outer ends may be any distance apart. Sleeve 36 loosely fits the bar 18 so that the bar may freely slide therethrough but carries an adjusting member 39 at the outer end, said adjusting member being provided with the zero mark 40 which coacts with the scale 41 on nut 22 said scale being divided in any suitable way, as for instance, to show hundredths, thousandths and ten thousandths of an inch, while the scale 19 shows a greater measurement. It is to be understood that the scales 19 and 41 may be any desired kind, as for instance, scales indicating inches and fractions or scales indicating meters or fractions thereof.

In Fig. 5 will be seen a slightly modified form of the invention in which the same principle is involved as in the preferred structure so that the detail construction of the modified structure only will be given, said modified structure comprising principally what may be termed cam members 42 and 43 on leg 2 and cam members 44 and 45 on leg 1. These cam members are spaced a sufficient distance apart to allow a free movement of the bar 18 as it moves back and forth but will maintain said bar substantially the same distance from the pin 8 at all times, as the ends of the cams act in a certain sense as pivotal points or knife edges. Aside from the use of these members for holding the bar 18 as described the structure is the same and the action of the various parts is the same.

What I claim is:

1. In a micrometer of the character described, a pair of pivotally mounted legs, adjustable mechanism for controlling the spreading of said legs, and means for maintaining said adjustable mechanism in a predetermined relationship to the pivotal point of said legs.

2. A micrometer of the character described, comprising a pair of leg members pivotally connected together near one end, a spring for tending to separate continually said leg members, a shaft extending through one of said leg members and slidingly positioned in the other leg member, means acting on said shaft for moving said leg members toward each other against the action of said spring, and a centering member held in position by the same pivotal member that connects said legs together, said centering member having a projection extending through said spring and a tubular member surrounding said shaft.

3. A micrometer of the character described, comprising a pair of pivotally mounted legs, each of said legs having slots extending substantially longitudinally thereof, a spring for continually urging said legs to move apart, a shaft, a pin extending through one end of said shaft and through the slots in one leg, a sleeve surrounding said shaft and provided with pins extending through the slots of the other leg, means for maintaining said shaft continually the same distance from the pivotal point of the legs, and a nut threaded on to said shaft for moving said legs together against the action of said spring, said pin sliding in said slots as the legs move.

4. In a micrometer of the character described, a pair of hinged legs, a spring tending to normally separate said legs, each of said legs being provided with a slot extending substantially longitudinally thereof, a shaft extending through one of said legs and into the opposite leg, a pin journaled in one end of said shaft and extending through the slot in one leg, a sleeve surrounding said shaft and extending into the opposite leg, a pin extending from said sleeve into the slot in said opposite leg, means for maintaining said shaft a predetermined distance from the hinged point of the legs, and a nut having graduations thereon threaded on to said shaft for acting on said sleeve and said shaft for closing said legs against the action of said spring.

5. In a micrometer of the character described, a pair of hinged legs, a spring normally separating said legs, each of said legs having a substantially longitudinally extending slot, a shaft, means maintaining said shaft a predetermined distance from the hinged point of said leg, a pin journaled in said shaft and extending into the slot of one of said legs, a sleeve loosely surrounding said shaft, a pin extending from said sleeve into the slot of the opposite leg, and a nut threaded on to said shaft acting on said sleeve for closing said legs against the action of said spring.

6. In a micrometer of the character described, a pair of hinged legs, a spring normally holding said legs separated, each of said legs having a substantially longitudinally arranged slot and an opening merging into the slot, a shaft extending through the opening in one of said legs and into the opening of the opposite leg, a pin having a pair of squared ends and a round center extending through said shaft, said round center being journaled in said shaft and said squared ends fitting said slots, a sleeve extending into one of said legs, a pin extending from said sleeve and into the slot in said last mentioned leg, said shaft carrying an adjustable zero member and a nut threaded on to said shaft, said nut having graduations thereon co-acting with the zero point of said zero member, said nut acting on said sleeve and on said shaft for closing said legs.

7. In a micrometer of the character described, a pair of hinged legs, a transversely positioned adjusting shaft, means for connecting said shaft with one of said legs and a sliding member for connecting the other of said legs to said shaft, a nut acting on said shaft for closing said legs, a spring acting on said legs for opening the same, and a compensating device for holding said shaft the same distance from the center of the hinge at all times, said compensating device including an adjustable bar, a sleeve surrounding said shaft and a pin extending through part of said sleeve and the shaft for pivotally connecting the sleeve with the shaft whereby inequalities and slight movements of the shaft may be accommodated.

8. In a micrometer of the character described, a pair of legs hinged together, a spring for opening said legs, means including a bar for closing said legs, and means acting on the bar for maintaining the bar the same distance continually from the pivotal point of said hinge.

PETER LACKNER.

Copies of this patent may be obtained for five cents each, by addressing the "Commissioner of Patents, Washington, D. C."